(12) United States Patent
Bär et al.

(10) Patent No.: US 9,193,381 B2
(45) Date of Patent: Nov. 24, 2015

(54) METHOD AND APPARATUS FOR AFFECTING CORNERING PERFORMANCE OF A MOTOR VEHICLE, AND A MOTOR VEHICLE

(75) Inventors: Michael Bär, Ingolstadt (DE); Karl-Heinz Meitinger, München (DE)

(73) Assignee: AUDI AG, Ingolstadt (DE)

( * ) Notice: Subject to any disclaimer, the term of this patent is extended or adjusted under 35 U.S.C. 154(b) by 215 days.

(21) Appl. No.: 13/369,815

(22) Filed: Feb. 9, 2012

(65) Prior Publication Data

US 2013/0041545 A1 Feb. 14, 2013

(30) Foreign Application Priority Data

Feb. 10, 2011 (DE) .......................... 10 2011 010 845

(51) Int. Cl.
| | | |
|---|---|---|
| *B60W 30/045* | (2012.01) | |
| *B60W 10/22* | (2006.01) | |
| *G05D 1/02* | (2006.01) | |
| *B60W 10/20* | (2006.01) | |
| *B62D 6/00* | (2006.01) | |
| *B60G 17/016* | (2006.01) | |
| *B60G 17/0195* | (2006.01) | |
| *B62D 6/06* | (2006.01) | |

(52) U.S. Cl.
CPC ............ *B62D 6/003* (2013.01); *B60G 17/0162* (2013.01); *B60G 17/0195* (2013.01); *B62D 6/06* (2013.01); *B60G 2400/104* (2013.01); *B60G 2500/10* (2013.01); *B60G 2500/40* (2013.01); *B60G 2800/9123* (2013.01); *B60G 2800/96* (2013.01)

(58) Field of Classification Search
CPC B60G 17/0164; B60G 17/0162; G06F 19/00; B62D 6/003
USPC .............................. 701/1, 23, 38, 41; 180/282
See application file for complete search history.

(56) References Cited

U.S. PATENT DOCUMENTS

| | | | |
|---|---|---|---|
| 4,905,783 A | | 3/1990 | Bober |
| 5,107,425 A | | 4/1992 | Donges et al. |
| 5,337,245 A | * | 8/1994 | Matsuzaki .................... 701/431 |
| 5,934,407 A | * | 8/1999 | Shimizu et al. ............... 180/446 |
| 6,169,946 B1 | * | 1/2001 | Griessbach ...................... 701/45 |
| 6,233,510 B1 | * | 5/2001 | Platner et al. ................... 701/37 |
| 6,253,123 B1 | * | 6/2001 | Schramm et al. .................. 701/1 |

(Continued)

FOREIGN PATENT DOCUMENTS

| | | |
|---|---|---|
| DE | 1 214 100 B | 4/1966 |
| DE | 38 25 280 A1 | 2/1990 |

(Continued)

*Primary Examiner* — Calvin Cheung
*Assistant Examiner* — Martin Weeks
(74) *Attorney, Agent, or Firm* — Henry M. Feiereisen LLC

(57) ABSTRACT

In a method and an apparatus for affecting the cornering performance of a motor vehicle, a transverse acceleration of the motor vehicle is determined, a desired transverse tilt of the motor vehicle defined based on the determined transverse acceleration, at least one actuator of an active suspension system of the motor vehicle is adjusted so that the motor vehicle assumes the desired transverse tilt, and an additional actuator intervening in the steering system of the motor vehicle. A yaw movement of the motor vehicle caused by the adjustment of the at least one actuator of the active suspension system is at least partially compensated by the additional actuator.

16 Claims, 3 Drawing Sheets

(56) References Cited

U.S. PATENT DOCUMENTS

| | | |
|---|---|---|
| 6,324,446 B1 | 11/2001 | Brown et al. |
| 6,339,739 B1 | 1/2002 | Folke et al. |
| 2002/0007239 A1 | 1/2002 | Matsumoto et al. |
| 2003/0122417 A1 | 7/2003 | Hackl et al. |
| 2004/0060765 A1 | 4/2004 | Mattson et al. |
| 2004/0117085 A1 | 6/2004 | Lu et al. |
| 2005/0228565 A1 | 10/2005 | Lohner et al. |
| 2005/0256622 A1 | 11/2005 | Futterer et al. |
| 2008/0040016 A1 | 2/2008 | Fujishiro |
| 2009/0025998 A1* | 1/2009 | Brandmeier et al. ......... 180/282 |
| 2009/0319128 A1* | 12/2009 | Lauer et al. ................ 701/42 |
| 2010/0049394 A1* | 2/2010 | Ammon et al. ............... 701/29 |

FOREIGN PATENT DOCUMENTS

| | | |
|---|---|---|
| DE | 40 31 317 A1 | 4/1992 |
| DE | 100 60 536 A1 | 6/2002 |
| DE | 101 41 273 A1 | 3/2003 |
| DE | 102 26 683 A1 | 12/2003 |
| DE | 102 35 026 A1 | 2/2004 |
| DE | 10 2006 033 635 A1 | 1/2008 |
| DE | 10 2007 024 755 A1 | 2/2008 |
| DE | 10 2008 041 417 A1 | 2/2010 |
| EP | 1 197 409 A2 | 4/2002 |
| EP | 2 233 332 A2 | 9/2010 |
| WO | WO 2006/037678 A1 | 4/2006 |

* cited by examiner

METHOD AND APPARATUS FOR AFFECTING CORNERING PERFORMANCE OF A MOTOR VEHICLE, AND A MOTOR VEHICLE

CROSS-REFERENCES TO RELATED APPLICATIONS

This application claims the priority of German Patent Application, Serial No. 10 2011 010 845.9, filed Feb. 10, 2011, pursuant to 35 U.S.C. 119(a)-(d), the content of which is incorporated herein by reference in its entirety as if fully set forth herein.

BACKGROUND OF THE INVENTION

The present invention relates to a method and an apparatus for affecting the cornering performance off a motor vehicle. The invention also relates to a motor vehicle with such an apparatus.

The following discussion of related art is provided to assist the reader in understanding the advantages of the invention, and is not to be construed as an admission that this related art is prior art to this invention.

Motor vehicles with active suspension system and/or stabilizers are known as Active Body Control (ABC), wherein their controllable suspension characteristics enable a specific compensation of pitch and roll movements. Typically, the vertical position of each wheel can be electro-hydraulically adjusted. In this way, the driving characteristics of a motor vehicle can be improved, in particular when driving along turns, for example in that the motor vehicle actively leans into the turn.

Disadvantageously, roll movements when negotiating turns typically cause feedback for the cornering performance of the motor vehicle. In particular, with active rolling, the axles of the motor vehicle are operated at an unfavorable operating point, causing the motor vehicle to steer into the turn when cornering, which must typically be compensated by a manual steering movement from the vehicle operator.

It would therefore be desirable and advantageous to obviate prior art shortcomings and to provide an improved method and an apparatus, which can improve the driving comfort for the occupants of the motor vehicle and which leads to a more natural steering characteristic of the motor vehicle in turns.

SUMMARY OF THE INVENTION

According to one aspect of the present invention, a method for affecting a cornering performance of a motor vehicle includes the steps of determining a transverse acceleration of the motor vehicle, defining a desired transverse tilt of the motor vehicle as a function of the transverse acceleration, adjusting at least one actuator of an active suspension system of the motor vehicle, so that the motor vehicle assumes the desired transverse tilt, and adjusting at least one additional actuator cooperating with a steering system of the motor vehicle so as to at least partially compensate a yaw movement of the motor vehicle caused by the adjustment of the at least one actuator of the active suspension system.

According to another aspect of the invention, an apparatus for affecting cornering performance of a motor vehicle includes a determination device configured to determine a transverse acceleration of the motor vehicle and to define a desired transverse tilt of the motor vehicle as a function of the determined transverse acceleration, at least one actuator of an active suspension system of the automobile, said at least one actuator coupled with the determination device and operating to adjust a transverse tilt of the motor vehicle so that the adjusted transverse tilt corresponds to the desired transverse tilt defined by the determination device; and at least one additional actuator coupled with the determination device and configured to cause an intervention in a steering system of the motor vehicle, said intervention at least partially compensating a yaw movement of the motor vehicle caused by operating the at least one actuator.

A motor vehicle according to the invention includes the aforedescribed apparatus according to the invention.

Advantageous embodiments of the invention may include one or more of the following features.

The transverse acceleration may be determined by measuring the current acceleration or the instantaneous transverse acceleration. Alternatively, the transverse acceleration of the motor vehicle may also be predetermined for a future time. This may be done, for example by using suitable vehicle models through calculation and/or within the context of a provided roadway preview. An expected transverse acceleration may also be estimated based on available data.

The term transverse tilt refers, in particular, to a rotation of the motor vehicle about its roll axis. Such rotary movements, also referred to as rolling, predominantly occur when the motor vehicle travels through turns, where transverse accelerations cause the motor vehicle to rotate and/over roll due to the centrifugal force. In particular, the desired transverse tilt may be defined so as to produce for the occupants of the motor vehicle a particularly comfortable and largely undisturbed driving experience when the motor vehicle rotates about the roll axis. This is particularly the case when the transverse accelerations subjectively experienced by the occupants are at least partially compensated. In particular, a desired transverse tilt curve may be defined, for example depending on the transverse acceleration. In the absence of transverse accelerations on the motor vehicle, this desired transverse tilt angle is 0°. Conversely, when transverse accelerations occur on the motor vehicle, this transverse tilt angle is different from 0°. The desired transverse tilt may particularly be a function of the transverse acceleration. The functional relationship may be provided by stored characteristic curves or by mathematically equations.

According to an advantageous feature of the present invention, the actuators of the active suspension system may include electro-hydraulic actuator systems, which act on the individual wheels of the automobile and control their vertical positions. The active suspension system may be an active spring system, for example an Active Body Control system and/or a system with active stabilizers. The individual actuators of the corresponding wheels can then be controlled such that only certain wheels are raised or lowered, thereby adjusting the predetermined desired transverse tilt of the motor vehicle.

According to an advantageous feature of the present invention, the at least one actuator which causes a steering intervention in a steering system of the motor vehicle may be adjusted so as to that at least partially compensate a yaw movement of the motor vehicle caused by the adjustment of the at least one actuator of the active suspension system. Adjusting the at least one actuator at step c) may affect not only the rolling performance, but also the cornering performance of the motor vehicle. Adjustment of the at least one actuator which causes the intervention in the steering system may at least partially, more particularly completely, affect the cornering performance.

With this method, a motor vehicle can be urged to actively tilt when travelling through a turn, thereby reducing uncomfortable transverse accelerations for the vehicle occupants. The subjective driving comfort increases considerably. In addition, the motor vehicle maintains the familiar steering characteristic almost unchanged when traveling through turns. The actively produced rolling of the motor vehicle then does not or only insignificantly change of the cornering performance of the motor vehicle, requiring no or only slight counter steering from the vehicle operator. In particular, the familiar steering characteristic of the motor vehicle remains almost unchanged. Driving comfort and driving safety are increased and the vehicle operator receives the familiar haptic feedback from the steering wheel.

According to an advantageous feature of the present invention, by adjusting the at least one actuator which causes the intervention in the steering system of the motor vehicle, a superimposed steering angle is superimposed on a first steering angle such that the radius of curvature of the turn traveled by the motor vehicle caused by the resulting steering angle corresponds substantially to the radius of curvature which would have resulted without the adjustment of the at least one actuator of the active suspension system at the first steering angle. Accordingly, a steering actuator actively intervenes in the steering movement of the motor vehicle. For this purpose, a generally existing steering system of the motor vehicle may be used to which the additional actuators for active steering intervention have been added. A vehicle operator then no longer needs to compensate the additional yaw movement of the motor vehicle caused by the active rolling along turns through manual counter steering, because the steering actuator performs this intervention automatically. The vehicle operator then experiences in turns the familiar steering characteristic of the motor vehicle. This obviates the need for manual counter steering which is viewed as annoying and which affects the driving safety.

According to another advantageous feature of the present invention, a vehicle operator may at least partially manually define the first steering angle, on which the superimposed steering angle is superimposed. Alternatively or in addition, this first steering angle may be defined by a system for semi-automatic vehicle guidance, in particular a lane assist system. However, the vehicle may also be guided autonomously or fully automatically, wherein the vehicle operator no longer actively intervenes in steering the vehicle. The invention is particularly advantageous when the steering angle is at least partially predefined by the vehicle operator, meaning that the motor vehicle is steered into a turn manually. When a vehicle guided semi-automatically, for example by a Heading Control, a number of driving-related operations are no longer performed by the vehicle operator himself, but instead by systems of the motor vehicle. These systems may, for example, correct the steering operation of the vehicle operator and intervene in critical situations.

According to yet another advantageous feature of the present invention, the at least one actuator which causes the intervention in the steering system of the motor vehicle is adjusted depending on the defined desired transverse tilt and/or the transverse tilt. A suitable steering actuator setting may be provided for each predetermined desired transverse tilt, with which an undesirable cornering performance of the motor vehicle can be compensated to a significant degree. The functional cooperation then guarantees very good results for yaw movement compensation.

According to an advantageous feature of the present invention, a superimposed steering angle may be adjusted with the at least one actuator which causes the intervention in the steering system of the motor vehicle. According to another advantageous feature of the present invention, the superimposed steering angle may be calculated from the desired transverse tilt and/or the adjusted transverse tilt with a mathematical function and/or from a characteristic curve. Advantageously, the functional relationship may be defined so as to at least partially compensate an additional yaw angle of the motor vehicle caused by the at least one actuator of the active suspension system by superimposing a steering angle in the opposite direction. Advantageously, a suitable compensating superimposed steering angle may be predetermined for all possible actively adjustable roll angles or transverse tilt angles. This allows excellent compensation for many feasible curve shapes.

According to an advantageous feature of the present invention, a future transverse acceleration of the motor vehicle may be determined with a device for automatic roadway preview and the desired transverse tilt of the motor vehicle may be defined with this device. Many different input parameters may be considered in the automatic roadway preview. For example, the respective transverse acceleration may be determined based on the instantaneous speed of the motor vehicle and the current steering wheel angle. Alternatively, map data may be provided which show the course of the roadway. For example, the current vehicle position may then be determined with a satellite signal sensor (e.g. a GPS [Global Positioning System]-Sensor), and the expected transverse acceleration may be determined based on the map material indicating the turns ahead of the vehicle. Data obtained from an environmental sensor (e.g. video camera, ultrasound sensors, etc.) may also be used for predicting the roadway. Data relating to the slope of the roadway may also be important input parameters for determining the expected transverse acceleration. With such a device for automatic roadway preview, the transverse tilt of the motor vehicle can be adjusted not only in response to an actual measured transverse acceleration, but the expected transverse accelerations may be determined before they actually occur. In this way, the transverse tilt can be optimally adapted to the prevailing conditions quickly and without time delay. The adjustment of the transverse tilt as well as the interventions of the steering actuator can then be designed to be even smoother and less abrupt, thus increasing the driving comfort for the occupants of the motor vehicle.

According to an advantageous feature of the present invention, the transverse acceleration may also be determined by using a signal from at least one sensor. This sensor may be, for example, an acceleration sensor (g-sensor) measuring the instantaneous transverse acceleration. Such sensors enable a particularly accurate measurement of the respective transverse acceleration.

According to yet another advantageous feature of the present invention, the at least one actuator for affecting the transverse tilt of the motor vehicle may be provided in an active suspension system or in an active stabilizer. Such suspension systems and/or stabilizer systems allow a particularly dynamic control of the vehicle tilt and a rapid adaptation to the respective situation commensurate with the requirements.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
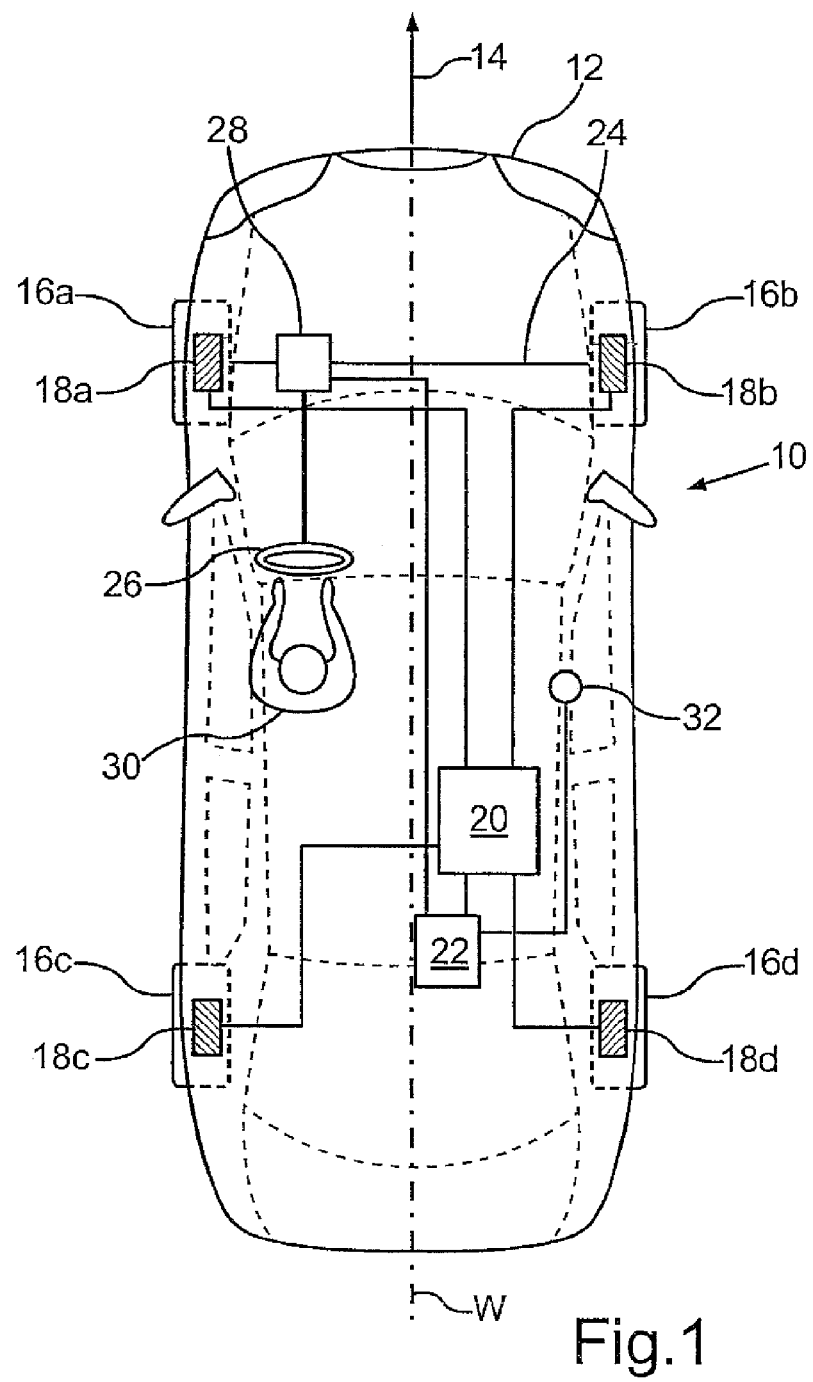
FIG. 1 shows a schematic top view on a motor vehicle with an active suspension system and an actuator for influencing the steering movement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 10 moving in a driving direction indicated by the arrow 14. The motor vehicle 10 has two front wheels 16a and 16b arranged proximate to its front side 12. These are connected with each other by way of a front axle 24. The motor vehicle also includes two rear wheels 16c and 16d. Vertical actuators 18a to 18d, which are part of an ABC (Active Body Control) actuator system, are associated with each of the wheels 16a to 16d in one to one correspondence. The vertical actuators 18a to 18d are controlled by an ABC control device 20. In this way, the vertical lift of each individual wheel can be individually adjusted. For example, the vertical actuators 18a can affect the vertical wheel position of wheel 16a. The ABC control device 20 is connected with a control device 22 which controls a semi-automatic vehicle guidance system. Alternatively, the ABC control device 20 and the control device 22 may also form part of a common control device. The motor vehicle 10 also includes a sensor 32 configured for measurement of the instantaneous transverse acceleration of the motor vehicle 10. The sensor 32 is connected with the control device 22 and transmits to the control device 22 the measurement information about the transverse acceleration.

The front wheels 16a to 16d can be steered via a steering system 26, i.e. the steering angle b can be adjusted with the steering system 26. In particular, the steering system 26 includes a steering wheel that can be operated by a driver 30. In addition to manual steering, the motor vehicle 10 also includes a steering actuator 28, with which the steering angle b of the wheels 16a and 16b can be automatically adjusted. To this end, the steering actuator 28 is connected with the control device 22. In particular, the steering actuator 28 is constructed so that a superimposed steering angle Δb can be superimposed on the steering angle b adjusted by the driver 30 with the steering system 26, resulting in a steering angle b+Δb. However, the steering wheel angle c of the steering wheel of the steering system 26 should continue to be the angle corresponding to the steering angle b. The driver 30 then does not receive a haptic feedback on the steering wheel relating to the superimposed steering angle Δb.

Figure 2:
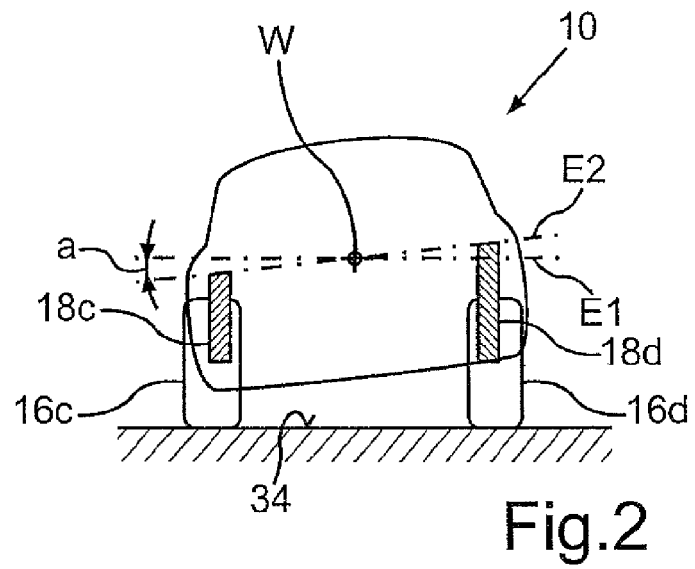
FIG. 2 shows a schematic rear view of a motor vehicle with an active suspension system.

FIG. 2 shows a schematic rear view of a motor vehicle with a conventional roll control. In the exemplary embodiment, the motor vehicle 10 travels through a left-hand turn. To enhance the driving comfort for the occupants of the motor vehicle 10, the vertical actuators 18a to 18d are controlled such that the body of the motor vehicle 10 tilts into the left-hand turn. The tilt is accomplished by a rotation about the roll axis W, which extends parallel to a roadway 34. When traveling in a straight line, no transverse forces act on the motor vehicle 10, so that its body is oriented substantially parallel to a plane E1. In a left-hand turn, the body is actively tilted by the vertical actuators 18a to 18d by a roll angle a. The body is then substantially parallel to a plane E2 which is no longer parallel to the roadway 34. The plane E2 then encloses the roll angle a with the plane E1. Because the vehicle body now leans into the turn, the transverse acceleration experienced by the driver 30 is improved.

Figure 3:
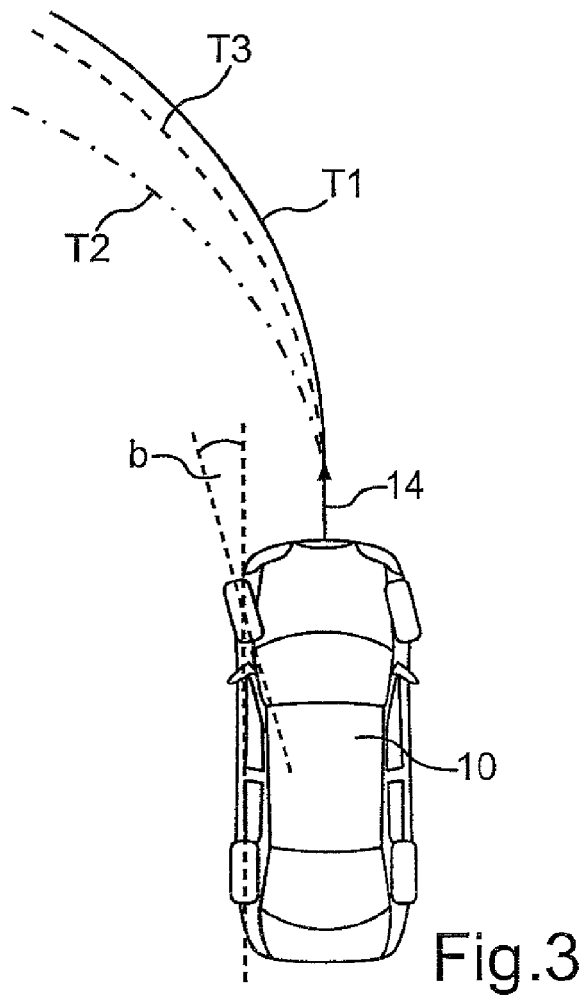
FIG. 3 shows a schematic top view on a motor vehicle with three possible travel paths.

FIG. 3 shows three possible trajectories T1, T2 and T3 along which the motor vehicle moves, depending on which systems affecting the driving dynamics are activated. The motor vehicle travels along the trajectory T1 when the steering angle b is set by the driver 30. In this example, neither does the motor vehicle 10 actively lean into the turn (see FIG. 2), nor does the steering actuator 28 actively intervene in the steering.

The situation illustrated in FIG. 2 will now be described, where the motor vehicle 10 tilts actively into the left-hand turn shown in FIG. 3 by the roll angle a. The motor vehicle 10 then no longer travels along the trajectory T1, although the steering angle b is set, but travels instead on the trajectory T2, which is tighter, i.e. has a smaller radius of curvature than the trajectory T1. Active rolling produces a yaw moment towards the left into the turn. The active rolling increases the yaw angle of the motor vehicle 10 in relation to the yaw angle associated with the trajectory T1, although the steering angle b remains the same. This corresponds to the situation known in the art. In order to be nevertheless able to travel along the trajectory T1, the driver 30 must correctively intervene in the steering system 26 by moving the steering wheel further to the right, i.e. by reducing the steering angle b. The driving characteristics of the motor vehicle 10 then appear unfamiliar to the driver 30. The driver 30 may be surprised that he must steer back to the right which may endanger the driving safety.

Figure 4:
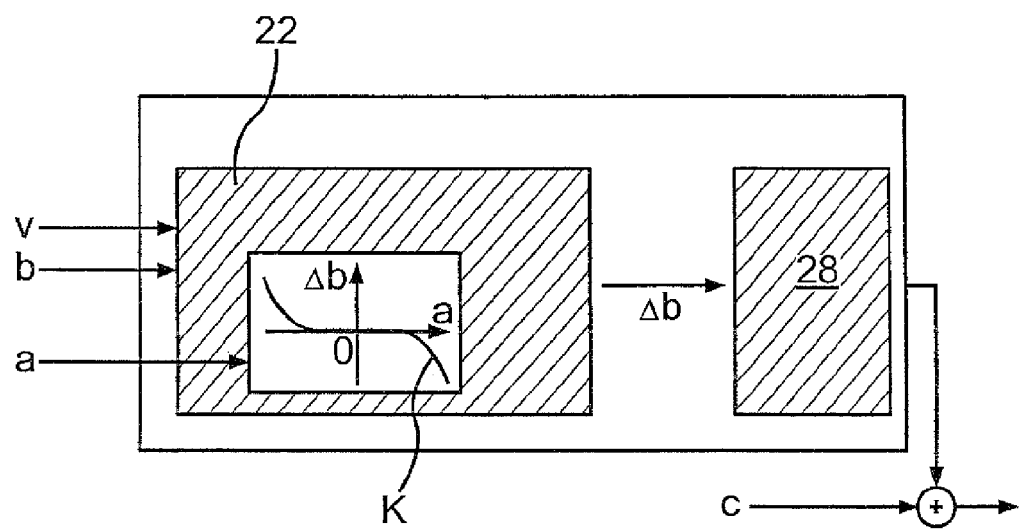
FIG. 4 shows a schematic illustration of a steering unit for determining a superimposed steering angle according to the invention.

The corrective steering intervention is therefore performed automatically. The situation is illustrated again in FIG. 4. The control device 22 computes a superimposed steering angle Δb which is applied on the steering system 26 by way of the steering actuator 28, thereby producing an effective steering angle b+Δb. The steering wheel angle c remains unchanged and keeps the value corresponding to the steering angle b. The control device 22 uses several input variables to compute the superimposed steering angle Δb. These are, in particular, the roll angle a, the steering angle b, and optionally the speed v of the motor vehicle 10. The superimposed steering angle Δb and the roll angle a are functionally correlated by way of a curve K. A roll angle a of 5° causes, for example, a superimposed steering angle Δb of −1°. Rolling to the left causes a superimposed steering angle Δb to the right and vice versa.

As a result, the actual trajectory T3 traveled by the motor vehicle 10 runs on the right of the trajectory T2. The radius of curvature associated with T3 is greater than the radius of curvature associated with T2. Ideally, the superimposed steering angle Δb is selected so that the trajectories T1 and T3 coincide. The driver 30 then experiences the familiar cornering performance of the motor vehicle 10. Correlating automatic rolling and automatic counter steering is particularly advantageous when the motor vehicle 10 is steered manually, or in the so-called chauffeur mode. The system composed of control device 22 and steering actuator 28 can also be referred to as superimposed steering system and may be constructed as an ADS.

The roll angle a is adjusted by acquiring with the control device 22 signals from the sensor 32 and determining with the control device 22 the transverse acceleration from these signals. Depending on the respective value of the transverse acceleration, the control device 22 now determines a suitable transverse tilt with the roll angle a and a suitable superimposed steering angle Δb. The transverse tilt is adjusted by transmitting signals from the control device 22 to the ABC control device 20, wherein the latter controls the corresponding lift of the individual vertical actuators 18a to 18d. The superimposed steering angle is adjusted by transmitting corresponding signals from the control device 32 to the steering actuator 28 which intervenes in the steering system 26 so as to define a particular steering angle for the wheels 16a and 16b.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for affecting a cornering performance of a motor vehicle, the method comprising the steps of:
    a) determining a transverse acceleration of the motor vehicle based on a signal received from at least one sensor installed on the motor vehicle;
    b) defining a desired transverse tilt of the motor vehicle as a function of the transverse acceleration determined at step a);
    c) adjusting with an Active Body Control (ABC) device at least one actuator of an active suspension system of the motor vehicle, so that the motor vehicle assumes the desired transverse tilt determined at step b); and
    d) adjusting with the Active Body Control (ABC) device at least one additional actuator, which intervenes in a steering system of the motor vehicle, by superimposing on a first steering angle used for steering the motor vehicle a superimposed steering angle to produce a combined steering angle so that a radius of curvature of a trajectory of the motor vehicle, when steered with the combined steering angle, corresponds substantially to the radius of curvature of the trajectory of the motor vehicle that would have resulted when the motor vehicle was steered with the first steering angle, thereby at least partially compensating a yaw movement of the motor vehicle caused by the adjustment of the at least one actuator of the active suspension system,
    wherein a suitable superimposed steering angle is predefined for all possible actively adjustable values of the desired transverse tilt,
    wherein at step a) a future transverse acceleration of the motor vehicle is determined by a device for automatic roadway preview, and
    wherein at step b) the desired transverse tilt of the motor vehicle is determined by the device for automatic roadway preview.

2. The method of claim 1, wherein the first steering angle is at least partially defined by a vehicle operator.

3. The method of claim 1, wherein the first steering angle is at least partially defined by a device for semiautomatic vehicle guidance.

4. The method of claim 1, wherein the first steering angle is at least partially defined by a lane assist device.

5. The method of claim 1, wherein at step d), the at least one additional actuator is adjusted depending on the defined desired transverse tilt or on the transverse tilt adjusted at step c).

6. A method for affecting a cornering performance of a motor vehicle, the method comprising the steps of:
    a) determining a transverse acceleration of the motor vehicle based on a signal received from at least one sensor installed on the motor vehicle;
    b) defining a desired transverse tilt of the motor vehicle as a function of the transverse acceleration determined at step a);
    c) adjusting with an Active Body Control (ABC) device at least one actuator of an active suspension system of the motor vehicle, so that the motor vehicle assumes the desired transverse tilt determined at step b); and
    d) adjusting with the Active Body Control (ABC) device at least one additional actuator, which intervenes in a steering system of the motor vehicle, by superimposing on a first steering angle used for steering the motor vehicle a superimposed steering angle to produce a combined steering angle so that a radius of curvature of a trajectory of the motor vehicle, when steered with the combined steering angle, corresponds substantially to the radius of curvature of the trajectory of the motor vehicle that would have resulted when the motor vehicle was steered with the first steering angle, thereby, at least partially compensating a yaw movement of the motor vehicle caused by the adjustment of the at least one actuator of the active suspension system,
    wherein at step a) a future transverse acceleration of the motor vehicle is determined by a device for automatic roadway preview,
    wherein at step b) the desired transverse tilt of the motor vehicle is determined by the device for automatic roadway preview, and
    wherein the superimposed angle is determined from the desired transverse tilt or from the transverse tilt adjusted at step c) with at least one of a mathematical function and a characteristic curve.

7. The method of claim 1, wherein the device for automatic roadway preview determines the future transverse acceleration based at least one feature selected from the group consisting of a speed of the motor vehicle, data relating to a course of the roadway, data relating to a roadway inclination, and a function for look-ahead longitudinal and transverse guidance.

8. The method of claim 1, wherein the at least one actuator used for adjusting the transverse tilt of the motor vehicle at step c) is arranged in an active stabilizer of the motor vehicle.

9. An apparatus for affecting cornering performance of a motor vehicle, comprising:
    a determination device configured to determine a transverse acceleration of the motor vehicle and to define a desired transverse tilt of the motor vehicle as a function of the determined transverse acceleration;
    at least one actuator of an active suspension system of the motor vehicle, said at least one actuator coupled with the determination device and operating to adjust a transverse tilt of the motor vehicle so that the adjusted transverse tilt corresponds to the desired transverse tilt defined by the determination device; and at least one additional actuator coupled with the determination device and controlled by an Active Body Control (ABC) device configured to cause an intervention in a steering system of the motor vehicle by superimposing on a first steering angle used for steering the motor vehicle a superimposed steering angle to produce a combined steering angle so that a radius of curvature of a trajectory of the motor vehicle, when steered with the combined steering angle, corresponds substantially to the radius of curvature of the trajectory of the motor vehicle that would have resulted when the motor vehicle was steered with the first steering angle, said intervention at least partially compensating a yaw movement of the motor vehicle caused by operating the at least one actuator, wherein a suitable superimposed steering angle is predefined for all possible actively adjustable values of the desired transverse tilt, wherein a future transverse acceleration of the motor vehicle is determined by a device for automatic roadway preview installed in the motor vehicle, and the desired transverse tilt of the motor vehicle is determined by the device for automatic roadway preview.

10. A motor vehicle comprising an apparatus, the apparatus comprising:

a determination device configured to determine a transverse acceleration of the motor vehicle and to define a desired transverse tilt of the motor vehicle as a function of the determined transverse acceleration;

at least one actuator of an active suspension system of the motor vehicle, said at least one actuator coupled with the determination device and operating to adjust a transverse tilt of the motor vehicle so that the adjusted transverse tilt corresponds to the desired transverse tilt defined by the determination device; and at least one additional actuator coupled with the determination device and controlled by an Active Body Control (ABC) device configured to cause an intervention in a steering system of the motor vehicle by superimposing on a first steering angle used for steering the motor vehicle a superimposed steering angle to produce a combined steering angle so that a radius of curvature of a trajectory of the motor vehicle, when steered with the combined steering angle, corresponds substantially to the radius of curvature of the trajectory of the motor vehicle that would have resulted when the motor vehicle was steered with the first steering angle, said intervention at least partially compensating a yaw movement of the motor vehicle caused by operating the at least one actuator, wherein a suitable superimposed steering angle is predefined for all possible actively adjustable values of the desired transverse tilt, wherein a future transverse acceleration of the motor vehicle is determined by a device for automatic roadway preview installed in the motor vehicle, and the desired transverse tilt of the motor vehicle is determined by the device for automatic roadway preview.

11. The method of claim 6, wherein the first steering angle is at least partially defined by a vehicle operator.

12. The method of claim 6, wherein the first steering angle is at least partially defined by a device for semi-automatic vehicle guidance.

13. The method of claim 6, wherein the first steering angle is at least partially defined by a lane assist device.

14. The method of claim 6, wherein at step d), the at least one additional actuator is adjusted depending on the defined desired transverse tilt or on the transverse tilt adjusted at step c).

15. The method of claim 6, wherein the device for automatic roadway preview determines the future transverse acceleration based at least one feature selected from the group consisting of a speed of the motor vehicle, data relating to a course of the roadway, data relating to a roadway inclination, and a function for look-ahead longitudinal and transverse guidance.

16. The method of claim 6, wherein the at least one actuator used for adjusting the transverse tilt of the motor vehicle at step c) is arranged in an active stabilizer of the motor vehicle.

* * * * *